United States Patent [19]

Hafner

[11] 4,382,387
[45] May 10, 1983

[54] METHOD OF COMPENSATING THE INTERFERENCE DC VOLTAGES IN THE ELECTRODE CIRCUIT IN MAGNETIC-CONDUCTIVE FLOW MEASUREMENT

[75] Inventor: Peter Hafner, Therwil, Switzerland

[73] Assignee: Flowtec AG, Reinach, Switzerland

[21] Appl. No.: 254,634

[22] Filed: Apr. 16, 1981

[30] Foreign Application Priority Data

Oct. 2, 1980 [DE] Fed. Rep. of Germany ....... 3037283

[51] Int. Cl.³ .............................................. G01F 1/60
[52] U.S. Cl. ................................................ 73/861.17
[58] Field of Search ..................................... 73/861.17

[56] References Cited

U.S. PATENT DOCUMENTS

| | | | |
|---|---|---|---|
| 3,316,762 | 5/1967 | Westersten | 73/861.17 |
| 3,965,738 | 6/1976 | Watanabe | 73/861.17 |
| 4,010,644 | 3/1977 | Bonfig et al. | 73/861.17 |
| 4,210,022 | 7/1980 | Boss | 73/861.17 |

Primary Examiner—Charles A. Ruehl

Attorney, Agent, or Firm—Gerald J. Ferguson, Jr.; Joseph J. Baker; C. Lamont Whitham

[57] ABSTRACT

A method of compensating interference DC voltages in the electrode circuit in magnetic-conductive flow measurement with periodically reversed DC magnetic field in which the useful signal is obtained by sampling and storing the signal voltage after each reversal of the magnetic field at opposite polarity values of the magnetic field during a sampling time interval and forming the difference of the stored sampled values, and wherein in a compensating time interval following each sampling time interval a compensation voltage is produced by sampling and storing the signal voltage, which compensation voltage is superimposed oppositely on the signal voltage for compensating the signal voltage within the compensation time interval to the value zero and is retained until the next compensation time interval, wherein each compensation time interval lies within the time interval corresponding to the switched-on magnetic field, in which also the preceding sampling time interval lies.

4 Claims, 2 Drawing Figures

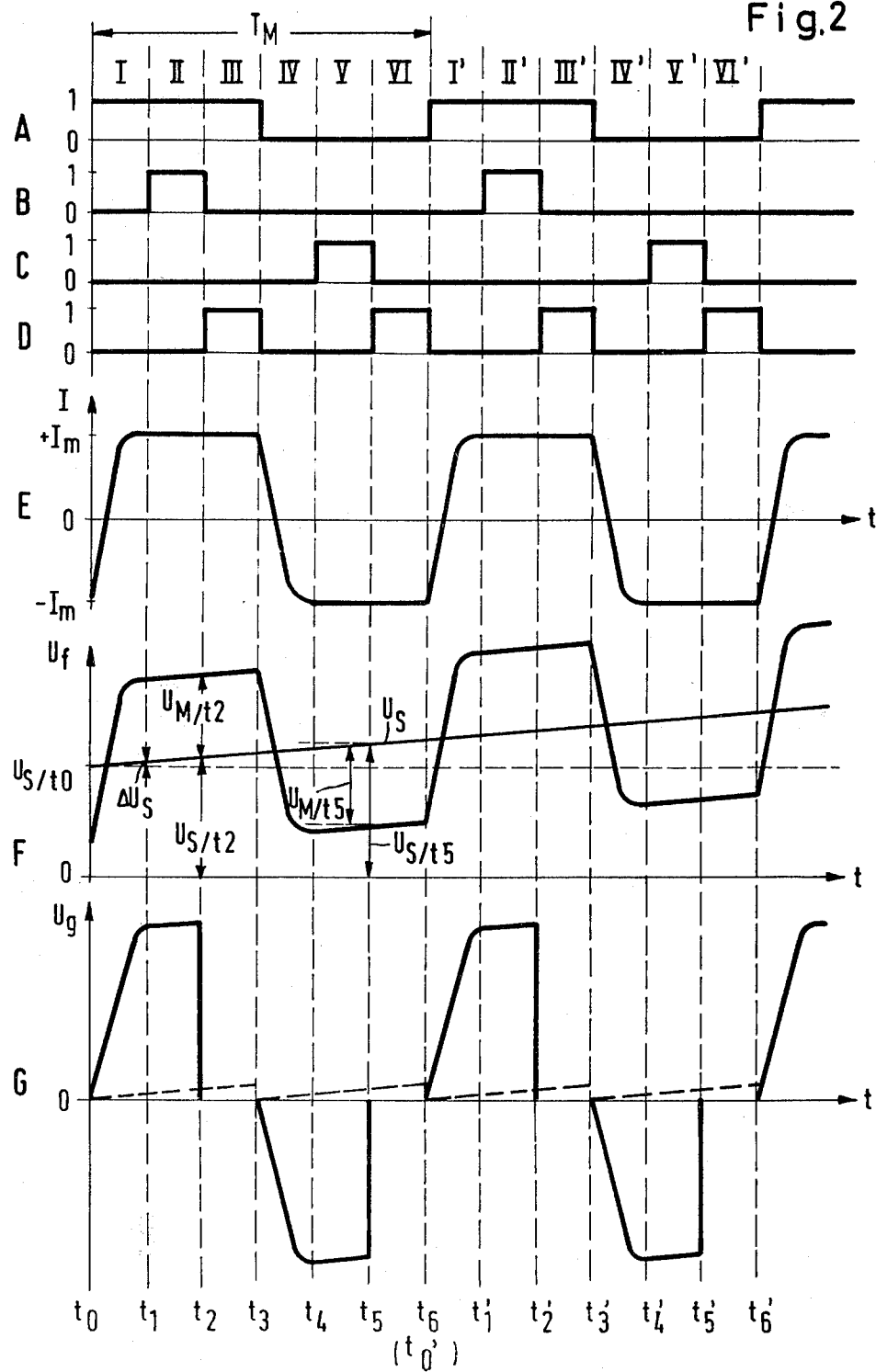

METHOD OF COMPENSATING THE INTERFERENCE DC VOLTAGES IN THE ELECTRODE CIRCUIT IN MAGNETIC-CONDUCTIVE FLOW MEASUREMENT

BACKGROUND AND SUMMARY OF THE INVENTION

The invention relates to a method of compensating the interference DC voltages in the electrode circuit in magnetic-conductive flow measurement with periodically reversed DC magnetic field in which the useful signal is obtained by sampling and storing the signal voltage after each reversal of the magnetic field at opposite polarity values of said magnetic field during a sampling time interval and forming the difference of the stored sampled values, and wherein in a compensating time interval following each sampling time interval a compensation voltage is produced by sampling and storing the signal voltage, which compensation voltage is superimposed oppositely on the signal voltage for compensating the signal voltage within the compensation time interval to the value zero and is retained until the next compensation time interval.

A method of this type is known from U.S. Pat. No. 4,210,022. The difference of the sampling values obtained with opposite polarity values of the magnetic field gives a useful signal which is freed from constant interference DC voltages which as is known in the magnetic-inductive flow measurement can be as much as a thousand times greater than the useful signal. By the formation and superimposing of an additional compensation voltage linear time variations of the interference DC voltages between the successive sampling time intervals are also compensated and above all the amplifiers and subtraction circuits used to process the signal voltage are prevented from being overdriven due to the interference DC voltages building up slowly to a very high value.

In this known method each compensation time interval lies in a pause in the magnetic field which is inserted in each case between two successive partial periods in which the magnetic field assumes its oppositely poled value. The signal voltage sampled to form the compensation voltage is thus the pure interference voltage. The magnetic field must therefore be periodically switched between three values such that the pauses in the magnetic field and the compensation time intervals contained therein cannot be utilized for observing the flow.

In similar manner, in a method known from U.S. Pat. No. 4,010,644 a compensation of time variations of the interference DC voltages is carried out by forming a compensation voltage which is oppositely superimposed on the signal voltage. In this known method the magnetic field is switched to and fro between two different values, one of which may be zero. In this case in each partial period in which the magnetic field has the smaller value (or the value zero) two compensation time intervals lie at the start and the end of the partial period respectively so that the compensation voltage stored at the end of the partial period and effective during the next sampling time interval is again the pure interference voltage. In this case the entire magnetic field partial period which contains the compensation time intervals is not available for observation of the flow. Compared with the previously outlined known method there is the further disadvantage that for the same power necessary for producing the magnetic field the measured value signal obtained is only half as great and consequently the signal-to-noise ratio is poorer.

The problem underlying the invention is the provision of a method of compensating interference DC voltages in the magnetic-conductive flow measurement which permits the maximum possible utilization of the available time for observing the flow and provides an increased useful signal for the same power expenditure.

According to the invention this is achieved in that each compensation time interval lies within the time interval, corresponding to the switched-on magnetic field, in which also the preceding sampling time interval lies.

With the method according to the invention, contrary to the known methods, the compensation voltage formed in each compensation time interval is not the pure interference voltage but contains the same useful voltage as the sampling value obtained and stored in the preceding sampling time interval. Since this compensation voltage in the following sampling time interval remains superimposed on the signal voltage in the opposite sense, for forming the stored sampling value a voltage is sampled which corresponds to the sum of the useful voltages of two successive magnetic field partial periods. In this manner the compensation time interval is also used for obtaining the measured value signal and observing the flow. Furthermore, the method is also suitable when the magnetic field is switched to and fro without pauses between two oppositely poled values so that no magnetic field intervals are lost for the observation of the flow.

Further features and advantages of the invention will be apparent from the following description of an example of embodiment with the aid of the drawings, wherein:

FIG. 1 shows the block diagram of an arrangement for carrying out the method and FIG. 2 shows time diagrams of signals which occur at various points on the arrangement of FIG. 1.

DESCRIPTION OF THE PREFERRED EMBODIMENTS

Figure 1:
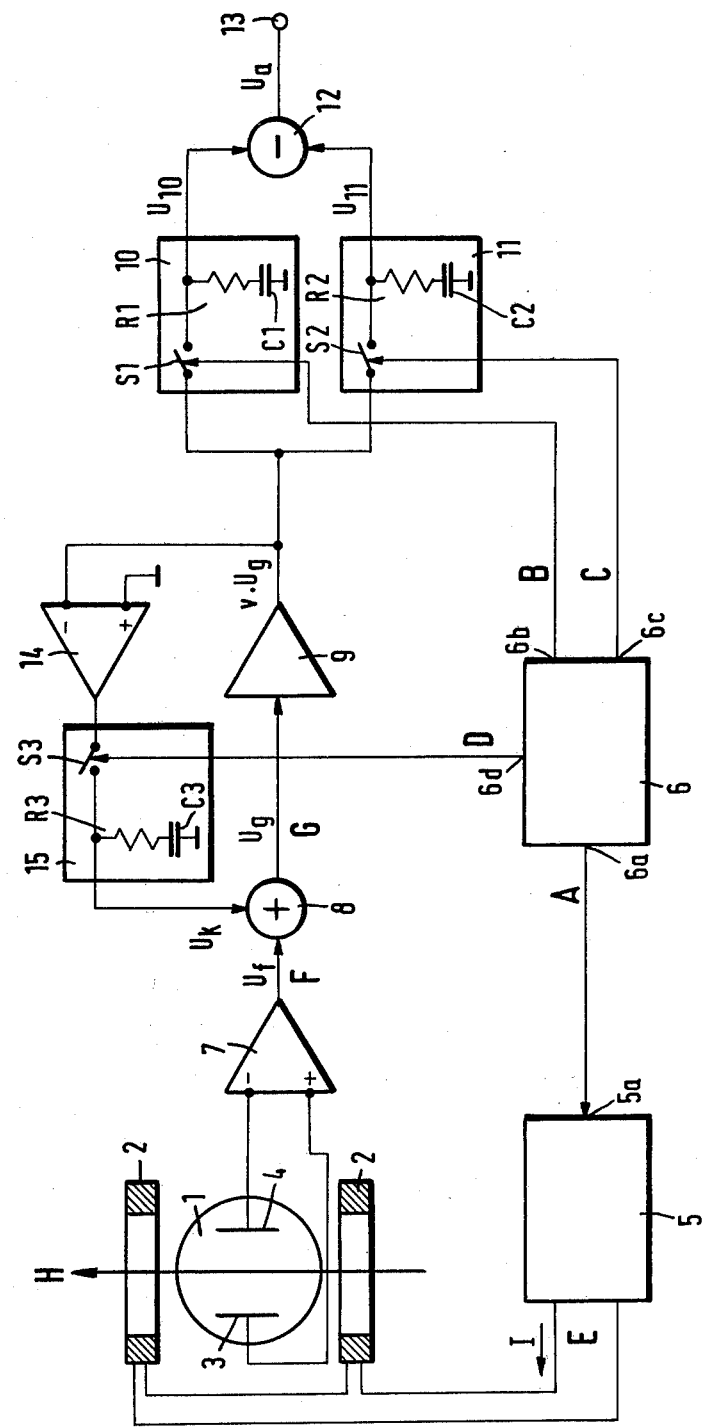

FIG. 1 shows diagrammatically an internally insulated tube 1 through which an electrically conductive fluid flows perpendicularly to the plane of the drawing. A magnetic field coil 2, which for reasons of symmetry is divided into two equal halves disposed on either side of the tube 1, produces in the tube a magnetic field H directed perpendicularly to the tube axis. In the interior of the tube 1 two electrodes 3 and 4 are disposed from which an induced voltage can be tapped which is proportional to the mean flow rate of the electrically conductive fluid through the magnetic field. A coil control circuit 5 controls the current flowing through the magnetic field coil 2 in dependence upon a control signal which is furnished by the output 6a of a control circuit 6 and applied to the control input 5a.

The electrodes 3 and 4 are connected to the two inputs of a differential amplifier 7. The differential amplifier 7 has such a small gain that even with high interference voltages (in the typical case ±1 V) it cannot overshoot.

The output of the differential amplifier 7 is connected to an input of a summation circuit 8 to the output of which the input of an amplifier 9 having a gain v is connected.

Connected in parallel to the output of the amplifier 9 are two sample and hold circuits 10 and 11. For simplification it is indicated that the sample and hold circuit 10 comprises a switch S1 which is actuated by a control signal furnished by the output 6b of the control circuit 6. When the switch S1 is closed it connects a storage capacitor C1 lying in series with a resistor R1 to the output of the amplifier 9 so that the storage capacitor C1 is charged to a voltage which depends on the output voltage of the amplifier 9. The circuit elements R1, C1 form together an integrating member which integrates the output voltage of the amplifier 9 during the closing time of the switch S1. When the switch S1 is opened the sampling value stored on the capacitor C1 is available until the next closing of the switch S1 at the output of the sample and hold circuit 10. To prevent the capacitor C1 being able to discharge after opening of the switch S1 a separating amplifier may follow the output of the circuit 10 in the usual manner; for simplification said separating amplifier is not illustrated in the drawings.

In the same manner the sample and hold circuit 11 includes a switch S2 which is closed by a control signal furnished by the output 6c of the control circuit 6 and a storage capacitor C2 which together with a resistor R2 forms an integrating member which integrates the output voltage of the amplifier 9 during the closing time of the switch S2. The charging voltage of the capacitor C2 reached after the opening of the switch S2 is available until the next closing of the switch S2 at the output of the sample and hold circuit 11 which can also be followed by a separating amplifier likewise not illustrated.

The outputs of the two sample and hold circuits 10, 11 are connected to the two inputs of a subtracting circuit 12 which furnishes at the output 13 a signal $U_a$ which corresponds to the difference between the sampling values stored in the sample and hold circuits 10, 11. The output signal $U_a$ forms the measured value signal which is a measure of the mean flow rate in the tube 1.

Also connected to the output of the amplifier 9 is the inverting input of an operational amplifier 14 whose non-inverting input, which serves as reference input, is applied to ground. Connected to the output of the operational amplifier 14 is a further sample and hold circuit 15 which contains a switch S3, a storage capacitor C3 and a resistor R3. The switch S3 is actuated by a control signal furnished by the output 6d of the control circuit 6. The output of the sample and hold circuit 15 is connected to the second input of the summation circuit 8.

The diagrams A, B, C, D, E, F, G of FIG. 2 show the time variation of signals which occur at the circuit points of FIG. 1 indicated with the same letters.

In FIG. 2 the duration $T_M$ of a complete measuring cycle, which is equal to a period of the alternating magnetic field produced by the coil 2, is divided into six equal portions I, II, III, IV, V, VI which start at the instants $t_0$, $t_1$, $t_2$, $t_3$, $t_4$, $t_5$. The portion VI ends at the instant $t_6$ which coincides with the starting instant $t_0'$, of the next measuring cycle. In corresponding manner the portions of this next measuring cycle are designated by I', II', III', IV', V', VI' and their end instants by $t_1'$, $t_2'$, $t_3'$, $t_4'$, $t_5'$, $t_6'$.

The diagrams A, B, C, D show the control signals emitted by the control circuit 6 which assume either the signal value 1 or the signal value 0. With the control signals B, C, D applied to the switches S1, S2, S3 the signal value 1 signifies the closing of the switch, i.e. the sampling phase, and the signal value 0 the opening of the switch, i.e. the hold phase.

The control signal A supplied to the coil control circuit 5 has during the time periods I, II, III the signal value 1 and during the time periods IV, V, VI the signal value 0. The coil control circuit 5 is so constructed that for the signal value 1 of the control signal it sends a direct current of constant magnitude in the one direction and for the signal value 0 of the control signal a direct current of the same magnitude but opposite direction through the magnetic field coil 2. The coil control circuit 5 includes a current regulator which adjusts the current for any polarity to the same constant value $+I_m$ or $-I_m$. The variation of the current flowing through the magnetic field coil 2 is illustrated in diagram E. Due to the inductance of the magnetic field coil after each reversal the current reaches the constant value $I_m$ of opposite polarity only with a certain delay. In the diagram E it is assumed that with the reversal initiated at the instant $t_0$ from negative to the positive value the regulated positive value $+I_m$ is reached within the time period I so that for the entire duration of the time periods II and III the current value $+I_m$ exists. Correspondingly, with the reversal initiated at the instant $t_3$ from the positive to the negative value the constant negative value $-I_m$ is reached within the time period IV so that the current value $-I_m$ exists for the entire duration of the periods V and VI.

The magnetic field H exhibits the same variation with time as the current I.

The switch S1 of the sample and hold circuit 10 is closed by the control signal B in each measuring cycle for the duration of the period II. The sample and hold circuit 10 thus samples the output voltage of the amplifier 9 in the middle third of the positive partial period of the magnetic field H and stores the sampling value integrated over this period.

The switch S2 of the sample and hold circuit 11 is closed by the control signal C in each measuring cycle for the duration of the period V so that the sample and hold circuit 11 samples the output voltage of the amplifier 9 in the middle third of the negative partial period of the magnetic field H and stores the sampling value integrated over this period.

The switch S3 of the sample and hold circuit 15 is closed by the control signal D in each measuring cycle for the duration of the periods III and VI, i.e. immediately following the sampling time intervals defined by the closure of the switches S1 and S2. When the switch S3 is closed a closed control circuit exists from the output of the amplifier 9 via the operational amplifier 14, the sample and hold circuit 15 and the summation circuit 8 to the input of the amplifier 9. This control circuit brings the voltage at the inverting input of the operational amplifier 14, i.e. the output voltage of the amplifier 9, to the reference potential at the non-inverting input, i.e. ground potential. Thus, the output of the sample and hold circuit 15 assumes in each compensation time interval defined by the closure of the switch S3, i.e. in each period III and VI of each measuring cycle, a compensation voltage $U_k$ which is oppositely equal to the signal voltage $U_f$ simultaneously applied to the other input of the summation circuit 8 and furnished by the output of the differential amplifier 7 so that the output voltage of the summation circuit 8 and thus also the output voltage of the amplifier 9 is rendered zero. After the opening of the switch S3, i.e. in the hold phase of the sample and hold circuit 15, the compensation voltage $U_k$ remains at the output of the sample and hold circuit 15 and said stored compensation voltage $U_k$ is added in the summation circuit 8 continuously to the particular signal voltage $U_f$ applied.

The diagram F shows the time variation of the signal voltage $U_f$ at the output of the differential amplifier 7. It includes a measuring voltage portion $U_M$ which depends on the flow rate in the tube 1 and the field strength of the magnetic field H. The measuring voltage $U_M$ is superimposed on an interference DC voltage $U_S$ which is due in particular to the different electrochemical equilibrium potentials. The interference DC voltage $U_S$ is not constant in time but increases and in the course of the measurement can reach values which may be a thousand times the measuring voltage $U_M$. To simplify the illustration and description it is assumed in the diagram F that the interference DC voltage $U_S$ at the instant $t_0$ has the value $U_{S/t0}$ and rises linearly; the increase of the interference DC voltage in each interval is designated by $\Delta_{US}$.

Thus, for example, the signal voltage $U_f$ has at the instant $t_2$ the value:

$$U_{f/t2} = U_{S/t2} + U_{M/t2}$$

and at the instant $t_5$ the value:

$$U_{f/t5} = U_{S/t5} - U_{M/t5}.$$

The compensation voltage $U_k$ has in each compensation time interval, i.e. in the periods III and VI of each measuring cycle, the same magnitude as the signal voltage $U_f$ but the opposite sign and it retains the value which it has reached at the end of each compensation time interval, i.e. at the instants $t_3$ and $t_6$, until the start of the next compensation time interval.

The diagram G shows the voltage $U_g$ at the output of the summation circuit 8:

$$U_g = U_f + U_k.$$

The output voltage of the amplifier 9 differs from the voltage $U_g$ only by the gain v; it thus has the same time variation but the value $v.U_g$.

Due to the compensation effect of the control loop outlined above the voltage $U_g$ in the period III has the value zero. At the instant $t_3$ the compensation voltage $U_k$ has reached the following value:

$$U_{k/t3} = -U_{f/t3} = -(U_{S/t3} + U_{M/t3})$$

At the instant $t_3$ the reversal of the magnetic field takes place so that the measuring voltage $U_M$ rapidly changes to the value corresponding to the negative magnetic field. On the other hand, the interference DC voltage $U_S$ is not influenced by the reversal of the magnetic field. The value $U_{S/t3}$ of the interference voltage reached at the instant $t_3$ is compensated to zero by the interference voltage portion $-U_{S/t3}$ contained in the stored compensation voltage $U_k$ during the periods IV and V. In the output voltage $U_g$ of the summation circuit 8 only the stored measuring voltage portion $-U_{M/t3}$ of the compensation voltage appears and now has the same sign as the measuring voltage portion $-U_M$ in the signal voltage $U_f$ and is added to the latter. On this sum voltage the uncompensated part of the interference voltage is superimposed, i.e. an interference voltage portion which at the instant $t_3$ has the value zero and rises linearly from this value in the positive direction.

Thus, the voltage $U_g$ has at the instant $t_5$ the following value:

$$\begin{aligned}U_{g/t5} &= U_{f/t5} + U_{k/t3}\\ &= (U_{S/t5} - U_{M/t5}) - (U_{S/t3} + U_{M/t3})\\ &= (U_{S/t5} - U_{S/t3}) - (U_{M/t3} + U_{M/t5})\end{aligned}$$

The term $(U_{S/t5} - U_{S/t3})$ corresponds to the increase in the interference DC voltage during the periods IV and V, i.e. with the previously assumed linear rise has the value $2\Delta U_S$.

The term $(U_{M/t3} + U_{M/t5})$ is the sum of the measuring voltages at the instants $t_3$ and $t_5$. The output voltage $v.U_g$ of the amplifier 9, which in the period V is sampled by the sample and hold circuit 11 for recovering the integrated sampling value $U_{11}$, thus contains the sum of two measuring voltage values, one of which was obtained and stored in the sample and hold circuit 15 in the period III during the previous positive partial period of the magnetic field H whilst the second measuring voltage value is contained in the signal voltage $U_f$ in the period V of the current negative partial period of the magnetic field.

If it is assumed that the flow rate in the tube 1 remains constant for the duration of the measuring cycle the two measuring voltage values $U_{M/t3}$ and $U_{M/t5}$ are of equal magnitude so that:

$$U_{M/t3} = U_{M/t5} = U_M.$$

The voltage $U_g$ at the instant $t_5$ is then $$U_{g/t5} = 2\Delta U_S - 2U_M$$

In the period VI the voltage $U_g$ is again brought to zero. At the instant $t_6$ the compensation voltage $U_k$ has assumed the following value:

$$U_{k/t6} = -U_{f/t6} = -(U_{S/t6} - U_{M/t6}).$$

For the voltage $U_g$ at the instant $t_2'$ the following relationship then applies:

$$\begin{aligned}U_{g/t2'} &= U_{f/t2'} + U_{K/t6}\\ &= U_{S/t2'} + U_{M/t2'} - (U_{S/t6} - U_{M/t6})\\ &= (U_{S/t2'} - U_{S/t6}) + (U_{M/t6} + U_{M/t2'})\end{aligned}$$

The corresponding amplified output voltage of the amplifier 9 is sampled in the period II' by the sample and hold circuit 10 to obtain the integrated sampling value $U_{10}$. It again contains two measuring voltage values, i.e. the value obtained and stored in the sample and hold circuit 15 in the period VI of the preceding measuring cycle and the value contained in the period II' in the signal voltage $U_f$.

Under the conditions defined above:

$$U_{g/t2'} = 2\Delta U_S + 2U_M.$$

If for simplification the integrated sampling values $U_{10}$ and $U_{11}$ stored in the sample and hold circuits 10 and 11 are made equal to the previously observed instantaneous values after amplification in the amplifier 9 the following relationship applies:

$$U_{10} = v(2\Delta U_S + 2U_M)$$

$$U_{11} = v(2\Delta U_S - 2U_M)$$

After forming the difference in the subtraction circuit 12 the output voltage obtained is $$U_a = U_{10} - U_{11} = v(2\Delta U_S + 2U_M) - v(2\Delta U_S - 2U_M)$$
$$U_a = v \cdot 4 U_M.$$

Thus, in the output voltage $U_a$ apart from the absolute interference DC voltage the interference voltage drift is also completely eliminated if it is assumed to be linear. The useful signal corresponds to four times the measuring voltage.

It is further apparent that the measuring voltages contained in the output signal have been obtained by integration in the four periods III, V, VI and II'. This corresponds to a signal observation over two thirds of the time, i.e. practically the entire time for which the magnetic field can be considered constant. Only the times of the magnetic field change due to the reversal are excluded from the signal observation.

It is further apparent that the absolute interference DC voltage is kept away from the amplifier 9 which apart from the measuring voltage need only process the relatively small interference voltage change between two compensation time intervals. The amplifier 9 may thus have a large gain without any danger of being overdriven.

The advantageous effects outlined are due to the fact that each compensation time interval lies completely within the period in which the magnetic field is switched on and has its constant value and in which also the previous sampling time interval lies. Due to this fact the stored compensation voltage contains apart from the interference DC voltage to be compensated also a measuring voltage portion which is utilized in the next sampling time interval to recover the useful signal. An advantage of this method is that for the compensation no magnetic field interruptions in which the magnetic field is zero are necessary for the compensation; it is thus particularly suitable in conjunction with a simple reversal of the magnetic field between two opposite values. The method is however not restricted to this case; it may readily also be used if magnetic field interruptions are provided for other reasons.

The division previously described of each half period into three equal periods of time, one of which forms the sampling time interval and another the compensation time interval, is of course only an example. Depending on the time variation of the magnetic field a different division may also be used. It is also not essential for the sampling time interval and the compensation time interval to follow each other without a gap. However, generally the aim will be to utilize the available time in which the magnetic field has its constant value as completely as possible for signal observation.

What we claim is:

1. A method of compensating the interference DC voltages in the electrode circuit in magnetic-conductive flow measurement with periodically reversed DC magnetic field in which the useful signal is obtained by sampling and storing the signal voltage after each reversal of the magnetic field at opposite polarity values of said magnetic field during a sampling time interval and forming the difference of the stored sampled values, and wherein in a compensating time interval following each sampling time interval a compensation voltage is produced by sampling and storing the signal voltage, which compensation voltage is superimposed oppositely on the signal voltage for compensating the signal voltage within the compensation time interval to the value zero and is retained until the next compensation time interval, wherein each compensation time interval lies within the time interval corresponding to the switched-on magnetic field, in which also the preceding sampling time interval lies.

2. A method as defined in claim 1 wherein the compensation time interval immediately follows the sampling time interval.

3. A method as defined in claim 2 wherein the sampling time interval and the compensation time interval together cover substantially the entire time in which the magnetic field has its constant value.

4. A method as defined in claim 2 or 3 wherein the sampling time interval and the compensation time interval are of equal magnitude.

* * * * *